(12) United States Patent
Sikdar et al.

(10) Patent No.: US 8,518,263 B2
(45) Date of Patent: Aug. 27, 2013

(54) METHOD FOR FABRICATION OF ELASTOMERIC ASYMMETRIC MEMBRANES FROM HYDROPHOBIC POLYMERS

(75) Inventors: Subhas K. Sikdar, Cincinnati, OH (US); John O. Burckle, Cincinnati, OH (US); Binay K. Dutta, Petronas (MY); Alberto Figoli, Lappano (IT); Enrico Drioli, Naples (IT)

(73) Assignee: U.S. Environmental Protection Agency, Washington, DC (US)

( * ) Notice: Subject to any disclaimer, the term of this patent is extended or adjusted under 35 U.S.C. 154(b) by 0 days.

(21) Appl. No.: 13/374,126

(22) Filed: Dec. 13, 2011

(65) Prior Publication Data

US 2012/0132590 A1 May 31, 2012

Related U.S. Application Data

(60) Division of application No. 11/598,840, filed on Nov. 14, 2006, now Pat. No. 8,096,424, and a continuation of application No. 11/598,840.

(51) Int. Cl.
*B01D 71/06* (2006.01)
*B01D 61/02* (2006.01)

(52) U.S. Cl.
USPC .............. 210/653; 210/500.34; 210/500.27; 210/500.21; 210/651; 210/650

(58) Field of Classification Search
USPC ............... 210/500.34, 500.21, 500.27, 653, 210/651, 650
See application file for complete search history.

(56) References Cited

U.S. PATENT DOCUMENTS 5,030,356 A * 7/1991 Blume et al. .................. 210/640

* cited by examiner

*Primary Examiner* — David C Mellon
(74) *Attorney, Agent, or Firm* — Glenna Hendricks; Hendricks and Associates

(57) ABSTRACT

Hydrophobic, asymmetric membranes are formed integrally from elastomeric polymers. The membranes have a dense, discriminating layer and a thick, porous support layer and require no other support. The membranes of the invention provide an economic advantage over prior art composite membranes used for separating target organics from a mixture. Using the methods of the invention it is possible to separate two or more organic components wherein discrimination is made on the basis of molecular size.

11 Claims, 4 Drawing Sheets

2 to 3 times better than that provided the PDMS composite membranes as typically used in this application.

METHOD FOR FABRICATION OF ELASTOMERIC ASYMMETRIC MEMBRANES FROM HYDROPHOBIC POLYMERS

This application is a continuation/divisional of U.S. patent application Ser. No. 11/598,840, filed Nov. 14, 2006, which has now issued on Jan. 17, 2012 as U.S. Pat. No. 8,096,424.

FIELD AND BACKGROUND OF THE INVENTION

This invention relates to the preparation and use of asymmetric hydrophobic membranes. While asymmetric hydrophilic membranes that preferentially remove water are known, the preparation of the elastomeric asymmetric hydrophobic membranes which act preferentially in transfer of organic compounds is new. The invention represents an advance in technology related to separation of organics from other organics and from water, from contaminated solutions and from air or other gaseous or vapor mixtures. The methods of the instant invention are more cost-effective than those previously available.

Until this time, the state of the art of the technology to produce pervaporation or vapor permeation membranes has been based on the formation of composite membranes. A composite membrane is composed of a porous support layer used to provide the physical support of the active membrane film, the thin second layer that is added to provide for the separation of the species of interest. While hydrophobic polymers such as those used herein have been known, the prior art comprises their use in composite membranes composed of a porous support such as a porous polymer, ceramic or metal support in either a flat (plate or film) or tubular shape which is overlain by a very thin, dense polymer film require several steps for their manufacture: (1) preparation of the support layer, (2) preparation of the membrane layer and (3) overlaying of the support with the membrane. There is need to reduce cost of both construction and use of hydrophobic membranes.

The first asymmetric (hydrophilic) membranes were developed in the late 1950's for use in reverse osmosis. This type of membrane, first fabricated from cellulose acetate, is capable of separating micro-molecular and ionic materials from water. Over the last 30 years, this technology using hydrophilic membranes has matured into a robust array of products and is used as a means of water purification for millions of gallons per day, providing both drinking water and highly purified reprocessed water for use in the electronics industry.

For use in processing organic compositions, the technology to date has been based on the use of composite membranes having a porous support layer to provide physical support for the active membrane film, the thin layer that provides means for separation of the species of interest. Composite membranes fabricated for separation application may be formed in any number of ways. Often the manner in which membranes are formed is governed by the physical form in which the membrane is applied, such as flat sheet, disc or spiral wound forms, all of which tend to be commercially prepared by a method in which an inert support layer is coated with a solution of polymer by various methods and dried to evaporate the solvent. Polymeric hollow fiber membranes can be spun from spinnerets, much like any synthetic fiber, to form a porous support. The support is then coated by dipping or, in a more advanced technology, plasma coated with a thin nonporous active membrane that serves as the separation membrane.

Several patents disclose membranes constructed of glassy polymers. These membranes are usually used for gas separation. For example, U.S. Pat. Nos. 4,880,441 and 4,935,141 disclose membranes made of glassy polymers or of more than one polymer. U.S. Pat. No. 5,147,550 to Wijmans discloses membranes for use in a pervaporation process. However, he does not make an asymmetric, hydrophobic membrane composed of an elastomeric polymer, though he does lists several such polymers in a list of polymers for making all membranes. However, no asymmetric hydrophobic membranes prepared from elastomeric polymers are disclosed in the prior art.

SUMMARY OF THE INVENTION

Figure 1:
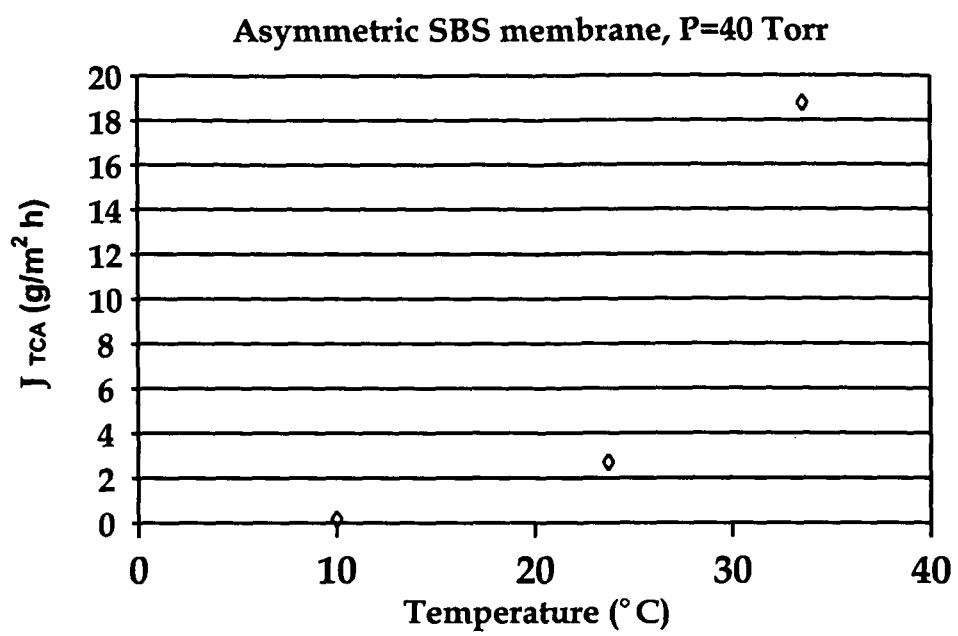
FIG. 1 shows TCA flux through the asymmetric SBS membrane.

The invention provides hydrophobic asymmetric membranes having a dense, thin discriminating layer on a thick and porous support layer, both layers being integrally of the same polymer made by (1) dissolving an elastomeric polymer having the appropriate glass transition temperature (Tg) in an organic solvent until complete dissolution of the polymer, (2) casting the product of step 1 on a temporary support to the desired thickness, (3) causing phase inversion of the polymer to take place on said support, (4) removing the membranes from the support after phase inversion is complete. If the phase inversion is accomplished using immersion in a coagulation bath, after complete coagulation, the membranes are transferred into a pure water bath, which is refreshed frequently, to remove traces of solvent. Said membranes can also be formed by casting the polymer in solution on the temporary support, then allowing evaporation to take place to achieve the phase inversion. In this case, inversion in a coagulation bath is not practiced. After removal from the temporary supports, the membranes are then dried (cured). A preferred method of drying is under vacuum, though vacuum is not necessarily needed.

The membranes of the invention are used to remove a target component from a mixture containing the target component by passing the mixture containing the target organic component across the dense surface of the asymmetric hydrophobic membrane, then collecting the target organic component emerging from the porous side of said asymmetric membrane.

DETAILED DESCRIPTION OF THE INVENTION

The preparation of such asymmetric membranes as taught herein will greatly increase separation capabilities of organics at lower costs. An asymmetric membrane is one that is formed by a void-filled structure which functions as the support which is overlain by a dense film which functions as the separation layer. The asymmetric membrane is formed in the single step of forming the membrane in a manner such that the membrane support and the separation (dense layer) are physically formed in one operation from the same polymer material.

The following definitions apply in the art and these terms are used in the following manner in this description:

Asymmetric membrane: A membrane wherein both the discriminating (dense) layer and a support layer are constructed of the same material. The membrane has a dense, thin barrier skin and a thick porous support layer. In the instantly disclosed and claimed membranes the thick porous portion of the membrane is such that no other support is required. For purposes of this invention, the discriminating layer and support layer of the membrane are formed integrally in one operation using a series of steps.

The focus of this invention is membranes constructed as asymmetric membranes that are constructed from hydrophobic elastomeric polymers that will function preferentially to remove solvent or light organics from water or other heavier organics using a pervaporation, osmotic or ultrafiltration mode. Polymers of interest in practicing the invention are the elastomers or rubbery polymers.

Elastomeric polymers chosen for a membrane are those which have a glass transition temperature (Tg) that is less than the temperature of the operation for the process for which they are prepared. At temperatures less than the glass transition temperature, the polymer becomes glassy in structure and, while amorphous, it does not support the solution-diffusion mechanism required for the separation of the organics from the bulk liquid. Each homopolymer and every copolymer composition has its own glass transition temperature. Hence, the polymer used in the membrane can vary depending on the temperature of the process for which it is intended. The polymer used for construction must have a Tg less than the temperature of the operation for which the membrane is prepared.

An asymmetric hydrophobic elastomeric membrane can be used for dense layer filtration-type separation for separating smaller organics from mixtures containing larger organic molecules, analogous to reverse osmosis processes used for water purification using hydrophilic membranes. Using the hydrophobic membranes of the invention, it is now possible to separate smaller organic molecules by pressure filtration from mixtures containing larger organic molecules. The membranes of the invention would be useful in processes of production and purification in the organic chemistry processes such as those used in the pharmaceutical and agricultural chemical industries as well as in processes for the protection of the environment. Using ultrafiltration and/or pressure driven processes, the membranes are useful for separation of larger molecules such as polymers, from organic solvents. In extreme cases, when the pore is very tight in the separation layer, the membranes can operate in the pervaporation mode.

The membranes may be made in different ways. Phase inversion can be accomplished by either evaporation or coagulation in a bath. Alternatively, from the melt, one can do thermally induced phase separation (TIPS) to create the dense layer. Different techniques are proposed to generate selective, permeable films. The most used, and thus the most important class of techniques, are called phase inversion processes. These processes rely on the phase separation of polymer solutions that result in production of porous polymer films. The phase separation mechanisms can be subdivided into three main categories depending on the parameters. The most used techniques are based on diffusion induced phase separation (DIPS). By exposing a polymer solution to a vapor or liquid, diffusional mass exchange will lead to a change in the local composition of the polymer film and demixing is induced. This technique is exemplified herein. Immersion in a coagulation bath, as exemplified, resulted in the formation of a thin, dense separation film on a thicker porous layer.

In one example, the phase inversion was accomplished by coagulation of the polymer using evaporation. The membrane was formed by casting on a temporary support and allowing the solvent to evaporate.

In a preferred method, the membranes were formed by phase inversion in the coagulation bath. The polymer solution was cast on a glass plate, then immersed in the bath. After 30 minutes it was removed from the coagulation bath. In this case, the membrane was easily removed from the glass plate. The immersion in the coagulation bath should take place before appreciable drying has occurred. In the examples presented herein, that time period was within 5 minutes of casting. The time will vary, however, depending on the polymer used. Using the styrene-butadiene-styrene block copolymer (SBS), the best time was 1-3 minutes after casting.

While the method identified wherein the membrane is placed in a coagulation bath is a preferred method, other methods that allow the phase inversion of the polymeric material, then drying, may be used. For example, the inversion can be allowed to occur if the membrane is left on the plate or other supporting template to allow the solvent to evaporate. The product of inversion is then dried, preferably under vacuum. (See example 8).

The membranes of the invention are particularly useful for removing organic solvents from organic/water mixtures in a process analogous to reverse osmosis and ultrafiltration used for purification of water. This invention represents an advance in the membrane technology suitable for the separation of organics from organics, from water, from contaminated aqueous solutions and from air or other gaseous or vapor mixtures using processes such as pervaporation, vapor permeation, and other separations such as filtration. These separations can be used in a wide variety of environmental protection technologies for pollution clean-up and in building more sustainable industrial environments through more ecological and energy efficient processing and resource management. In the case of hydrophilic membranes, the pollutant is retained by the membrane as the water flows through it. In the case of membranes of the invention, the target organic molecules would pass preferentially through the membrane. By manipulation of temperature and pressure, organic/organic separations could be achieved.

Because of the differences in solubility of membrane-forming materials in the case of hydrophobic vs. hydrophilic membranes, the techniques for making a membrane film from a hydrophilic polymer vs. a hydrophobic polymer require different solvents. The methods for forming hydrophobic membranes are a part of the instantly disclosed and claimed invention. While preparations of composite membranes using the polymers utilized herein have been known previously, the asymmetric hydrophobic membranes were not previously known.

The method of preparing the asymmetric membranes of the invention from hydrophobic polymer uses the diffusion induced phase inversion (DIPS) method. A hydrophobic polymer is treated in such a manner that it is transformed into an asymmetric membrane. Using solvent-nonsolvent pairs with a high mutual affinity [e.g., tetrahydrofuran (THF) (solvent)/alcohol (nonsolvent)], it is possible to produce asymmetric dense membranes.

The process used enables control over the resulting membrane morphology. In examples 1-7, a styrene-butadiene-styrene block copolymer obtained from Aldrich was used as the hydrophobic polymer. The polymer contains 28% styrene and also contains phenolic antioxidant. The CAS number is 9003-55-8.

Membrane Formation Procedure

Different membrane structures were obtained by using different solvent/nonsolvent pairs. The influence of several operating parameters on the resulting membrane morphology was determined. The SBS was added to three different solvents: toluene, DMA-(dimethyl acetimide)/toluene mixture, and THF at three different concentrations each (15 wt. %, 20 wt. % and 25 wt. %) at room temperature. The SBS polymer could not be dissolved in pure DMA. Therefore various amounts of toluene were added to the DMA to increase the solubility of the polymer in the prepared solution. In examples 1-8, all polymer solutions were stirred for at least 1 day to assure complete dissolution of the polymer. The resulting solution was cast uniformly onto a glass substrate by means of a hand-casting knife with the thickness gap set at any of 250, 300, 488, 599, or 788 μm to provide a range of starting thicknesses. The casting assembly was then immediately immersed in a coagulation bath. After complete coagulation, the membrane was transferred into a pure water bath, which was refreshed frequently for at least 24 hours to remove all traces of the solvent. The membrane sample was then dried at 60° C. and cured overnight under vacuum.

The preparation conditions for each membrane constructed are given in Table 1. The different tested variables were:
  3 different polymer concentrations: 15-20-25 wt. %,
  polymer solvents: Toluene, DMA/toluene mixture and THF (tetrahydrofuran),
  coagulation bath liquid: water, ethanol, and butanol only, and various mixtures of water+ethanol, ethanol+butanol, ethanol+octanol. In the table, the first thickness is the thickness of the polymer solution spread (cast) on the glass substrate. The thickness results from the gap set at the recited casting knife thickness. The second thickness is the thickness of the membrane after coagulation as measured by a micrometer.

TABLE 1

List of the experiments performed at different polymer concentrations, with different solvent and non-solvent combinations.

| Example Number | Solvent | Non-solvent | Casting knife thickness, μm | Membrane type | Membrane thickness (μm) | Comments |
|---|---|---|---|---|---|---|
| SBS Content 15-18 Wt % | | | | | | |
| 1 | DMA (90%), Toluene (10%) | H2O | 250 | Almost Completely Dense | ~60 | Partly Transparent, Partly Opaque Similar to composite membrane top layer |
| SBS Content 20 Wt % | | | | | | |
| 2 | THF | H2O | 788 | Almost Completely Dense | ~150 | Opaque, thick |
| 3 | THF | EtOH | 250 | Asymmetric | ~125 | White, handleable |
| 4 | THF | BuOH | 488 | Asymmetric Dense | ~30 | White, handleable |
| SBS Content 25 Wt % | | | | | | |
| 5 | THF | EtOH (80%), BuOH (20%) | 788 | Asymmetric dense | 50-90 dense top layer | White, slight demixing, handleable |
| 6 | THF | EtOH (50%), BuOH (50%) | 788 | Asymmetric Dense | ~30 | White, slight demixing, handleable |

Non-Solvent: - This is the chemical used in the coagulating bath to achieve the phase inversion of the polymer. (In this instance, the solvent used to dissolve the polymer prior to casting is soluble in this chemical, but the polymer is not.)
Comments: Handleability: the membrane was easy to handle; Demixing: the membranes after drying present different spots: more white and more transparent; Shrinking, the membrane shrinks after drying; Transparent means that is completely dense, Transparent/Opaque means that the membrane starts to be asymmetric, (White), an asymmetric structure is obtained. In the cases where dense membranes were formed, pores can be seen on the surface. However, there were no interconnections of these pores to the opposite surface, and hence these pores were not active in the separation. In all cases in which an asymmetric membrane was formed, a selective dense layer was formed over a porous support layer. Pores appear in the dense layers that do not tend to interconnect and are "closed". The porous layer should provide minimal resistance to separation. Hence, open pores that connect with the out side of the support layer to the interface with the dense layer are desired to facilitate physical transport of the permeating compounds to the product side of the membrane.

EXAMPLE 1

Regarding the morphology of a membrane prepared with 18 wt. % of polymer dissolved in 90/10 wt. % DMA/toluene mixture, cast at a thickness of 250 μm, and placed into a water bath for coagulation, the cross-section is about 60 μm in thickness and is almost completely dense in structure. The top surface of the membrane shows an essentially dense structure with the presence of some pores. This structure is similar to the one obtained with the same starting solvent solution but prepared by solvent evaporation. This result indicates that the presence of toluene, even at low concentration, influences the membrane preparation resulting in a dense structure. The membrane was both partly transparent and opaque.

EXAMPLE 2

Regarding the morphology of an asymmetric membrane prepared with 20 wt. % of polymer dissolved in THF, cast at a thickness of 788 μm, and placed into a water bath for coagulation. It was seen that this technique also results in the production of a membrane having an essentially dense structure. The membrane is completely opaque and is about 150 μm thick. This membrane is almost completely dense. The top surface has a very large number of pores that are visible at the membrane surface. The bottom surface appears smooth with a few pore openings, but has a dimpled appearance.

EXAMPLE 3

A 20/80% SBS in THF solution was cast at a thickness of 788 μm, and pure ethanol was used as the coagulation bath. This condition produced an asymmetric membrane with a very thin, dense top surface skin, ~1 um in thickness, with a quite smooth surface having no noticeable pores.

EXAMPLE 4

In this case, the same SBS—THF solution as used in experiment 3 was cast (at a thickness of 488 μm) and then introduced into a coagulation bath of butanol. The resulting membrane has an overall thickness of about 200 μm. The separation membrane (top layer) formed appears to be thin, on the order of 30 μm or so, with the top surface having a few pores and numerous nodules, ranging from about 1 to 5 μm. This gives the top layer a more rugged appearance. The bottom of the support layer appears to be smooth, but of irregular topography. The internal support structure appears to have the structure of a sponge in which the cells interconnect, forming passageways or long tunnel-shaped cavities within the structure. This more open support structure is promoted using a higher molecular weight alcohol as the nonsolvent (butanol).

EXAMPLE 5

In this case, a 25/75% SBS-THF solution was cast at a thickness of 788 μm and then introduced into a coagulation bath of 80/20 ethanol-butanol mixture. The resulting membrane is about 150 μm in thickness, and is comprised of two layers of distinctly differing structure. The top surface layer is quite dense, about 90 μm in thickness and contains a number of discrete micro-voids. The support layer appears to be a tightly woven structure where the polymer intersections are joined, forming a network of multidirectional channels or interconnected voids. The skin surface of the top layer appears to be very "tight", with essentially no visible pores. The skin surface of the bottom layer appears smooth with a large number pores of 2.5 μm and smaller.

EXAMPLE 6

Again, a 25/75% SBS in THF solution was cast at a thickness of 788 μm, and a 50/50 ethanol-butanol mixture was used as the coagulation bath. This condition produced an asymmetric membrane having an overall thickness of about 170 μm, with the separation film ~30 μm thick. It appears that the porous structure of the center core is greatly expanded leaving only a very thin film of only a micron or so on the bottom surface. Both surfaces appear to be relatively smooth but with irregular topography. Both surfaces have a number of essentially round pores ranging from 2 to 5 μm in diameter. The pores in the dense, discriminating layer are closed pores. The surface of the dense layer also has a large number of nodules that are generally smaller in size than the pores.

EXAMPLE 7

At this time, the asymmetric SBS membrane produced as described in the preceding narrative, has been used in a pervaporation apparatus to demonstrate its utility. The test solution selected was an aqueous mixture of about 100-120 ppm of 1,1,1-trichloroethane (TCA) in demineralized water, approximating a typical level of slightly soluble volatile organic compounds in water. The experiments were conducted at three different temperatures (10° C., 25° C., 35° C.) using vacuum permeate pressures of about 10, 25, 40 Torr, at a constant feed flow rate (2 liters per hour). In all tests, the test membranes were equilibrated over a 2 hour period prior to beginning the test. The study was started with a feed solution volume of about 2 liters, which was recirculated from the pervaporation cell to the feed tank. The feed tank concentration was checked between runs and refreshed as necessary.

The permeate was collected from the membrane cell in a double (in series) condensation trap to verify that the condensation of the TCA occurred essentially in the first trap. The permeate was weighed, and together with feed and retentate samples, was analyzed using a gas chromatograph equipped with a auto-sampler and a MS detector (Hewlett Packard 6890) to determine the amount of TCA present in these samples. The data reported are the averages of two studies. These parameters are typical to those found routinely in the literature.

The performance of the pervaporation process is described by the following parameters:

a) flux, J, which is the flow rate of permeate per unit membrane area.

b) the separation factor, $\forall$, which describes the ability of the process to separate the substances i and j, wherein "i" refers to the organic permeating component and "j" to the fluid from which "i" is being removed; it is calculated from the concentration of the components in the feed, $C_{f(i,j)}$, and in the permeate, $C_{p(i,j)}$, according to the relation:

$$\forall_{i/j} = (C_{pi}/C_{fi})/(C_{pj}/C_{fj})$$

The pervaporation performance of the asymmetric SBS membrane for the separation of TCA from water is shown in the following graphs.

The flux measurements observed for the permeating species (organic, water, and total) is shown. The TCA, water, and total fluxes increase with an increase of temperature (from 10° C. to 35° C.) at a constant permeate pressure (40 Torr). At a permeate pressure of 40 Torr and temperature of about 35° C., the TCA flux is of about 18 g/m2 hr and the water flux of about 30 g/m2 h.

Figure 2:
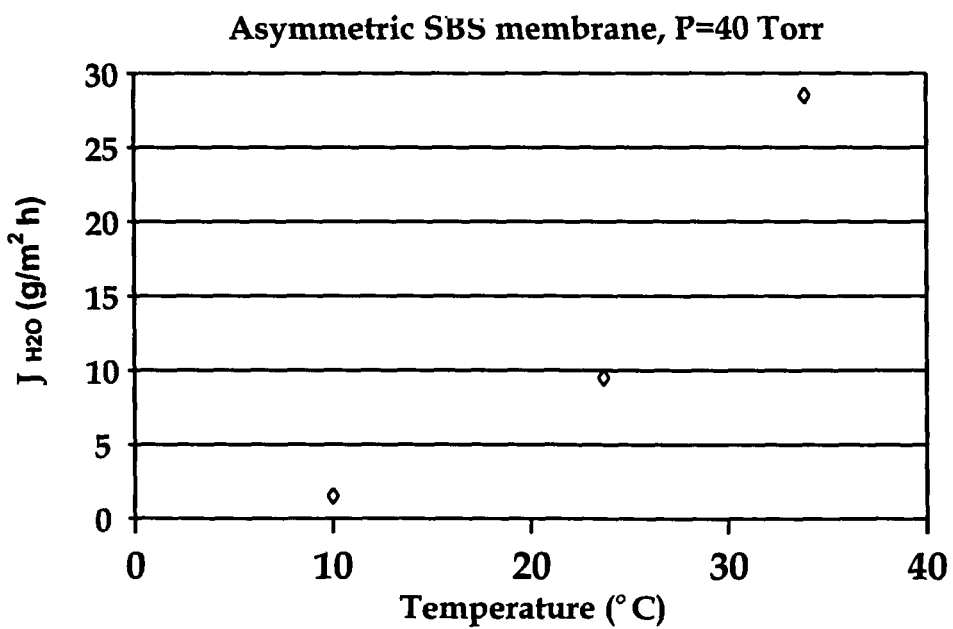
FIG. 2 shows water flux through the asymmetric SBS membrane
Figure 3:
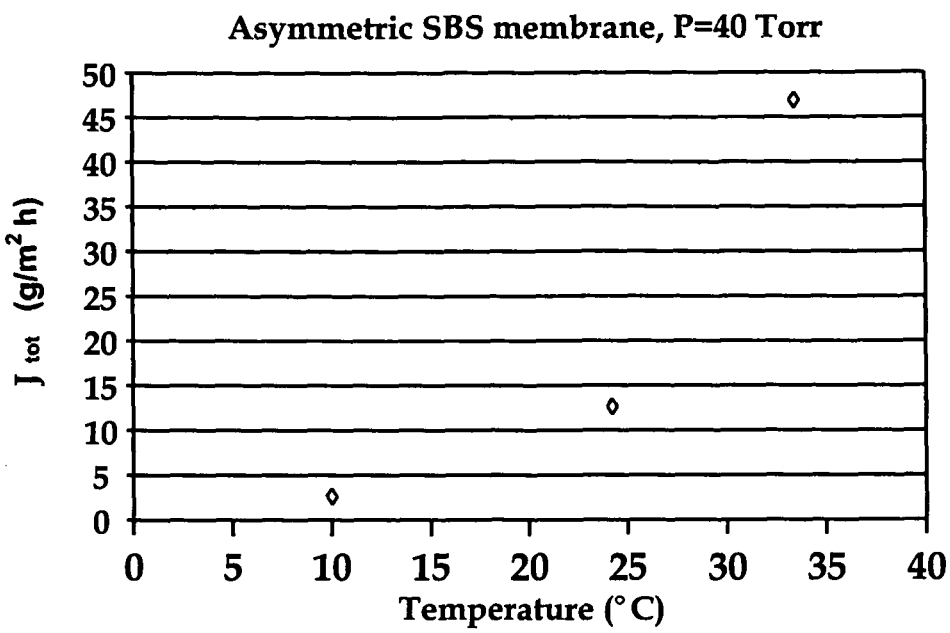
FIG. 3 shows total flux through the asymmetric SBS membrane

Turning to FIG. 1, the graph shows the TCA flux through the asymmetric SBS membrane at different temperatures and at downstream pressure of 40 Torr. FIG. 2 is a graph of water flux through the asymmetric SBS membrane at different temperatures and at a downstream pressure of 40 Torr, while FIG. 3 shows total flux through the asymmetric SBS membrane at different temperatures and at a downstream pressure of 40 Torr.

Under these conditions, it was observed that at the higher permeate pressure the water flux decrease is more pronounced than the TCA flux. This will lead in an increase in separation factor of the membrane at higher permeate pressure.

The effect of temperature and the operating pressure on the separation factor was studied. The separation factor increases from 900 to 4600 over the temperature range of 10° C. to 35° C. at the permeate pressure of 40 Torr. At 24° C., the separation factor increases (from 640 to about 2300) with the change in the permeate pressure from 10 to 40 Torr.

Figure 4:
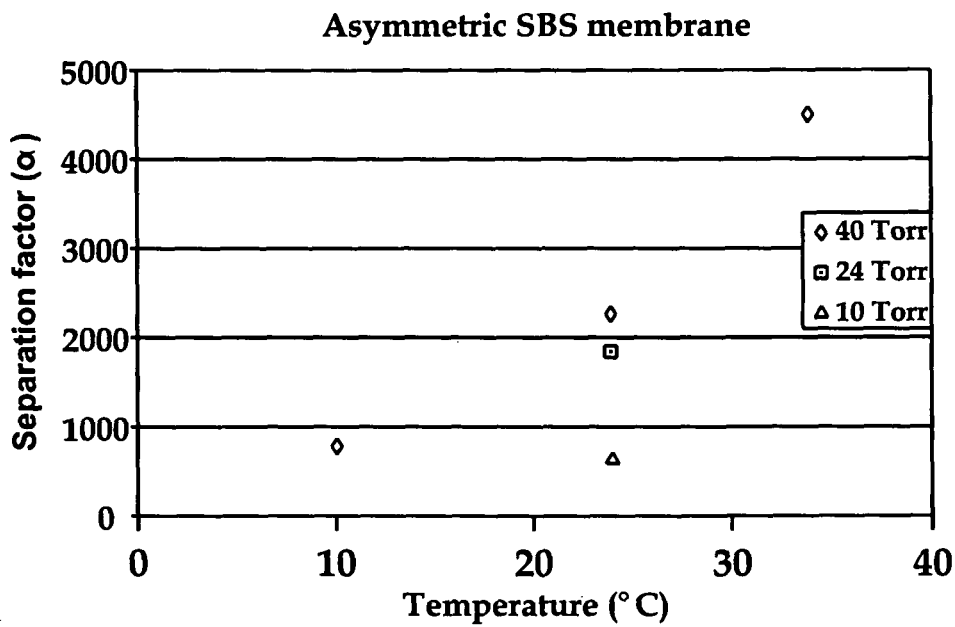
FIG. 4 shows the separation factor of the asymmetric SBS embreane.

FIG. 4 is a graph showing the separation factor of the asymmetric SBS membrane at different temperatures and permeate pressure.

The pervaporation performance (flux) of the asymmetric SBS membrane for the separation of TCA from water is shown at different permeate pressures. The TCA, water and total flux decrease with an increase in permeate pressure at the same operating temperature of about 25° C.

Figure 5:
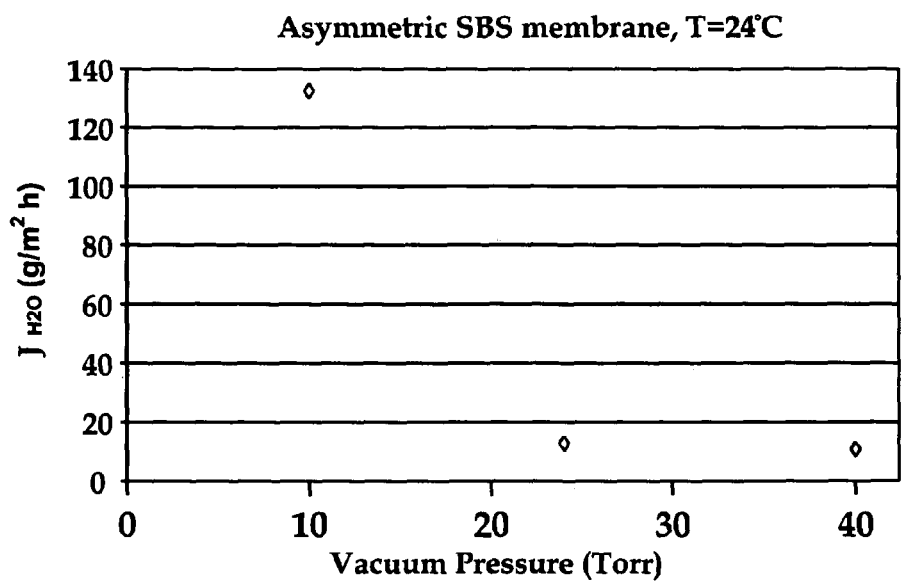
FIG. 5 shows water flux through the asymmetric membrane at different downstream pressure
Figure 6:
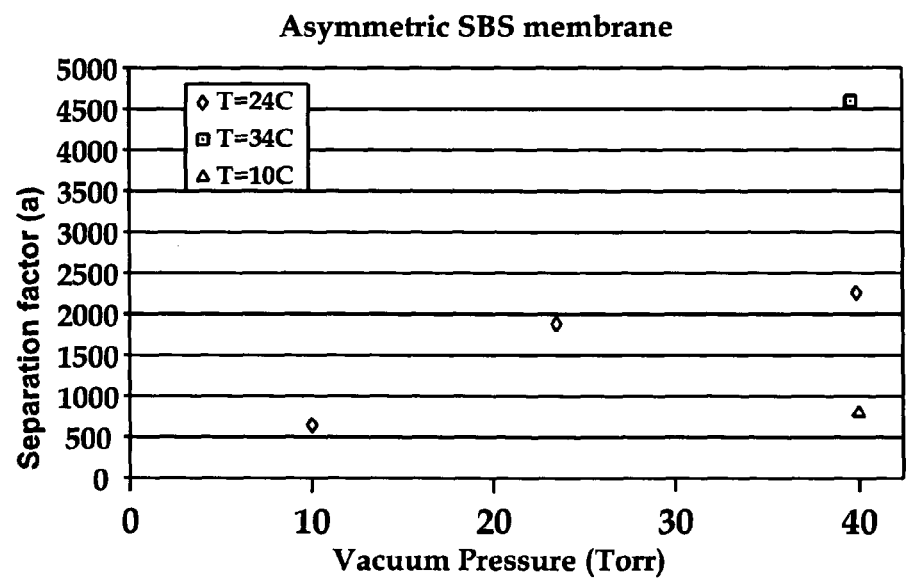
FIG. 6 shows the separation factor for asymmetric SBS membrane ad different downstream pressures.
Figure 7:
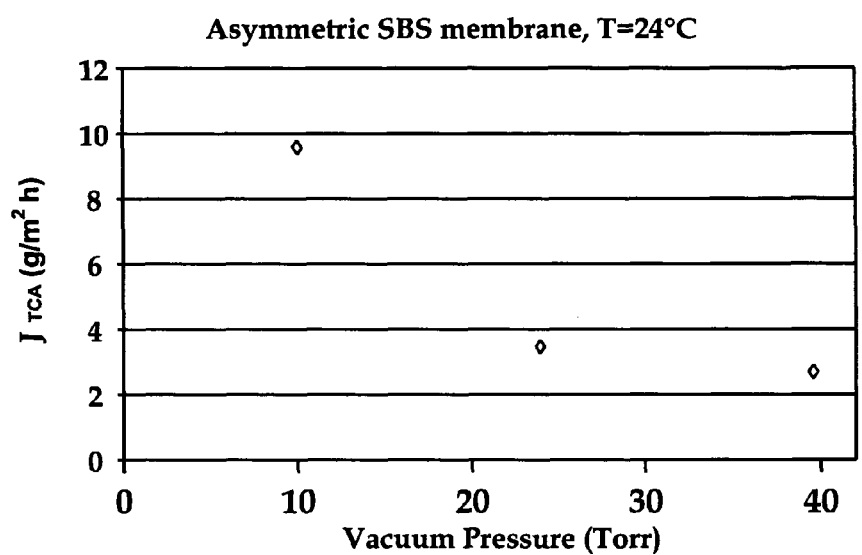
FIG. 7 shows TCA flux through the asymmetric SBS membrane at different pressure and constant temperature.

FIG. 5 is a graph showing water flux through the asymmetric SBS membrane at different downstream pressures and constant temperature (24° C.). FIG. 6 is a graph showing the separation factor of the asymmetric SBS membrane at different downstream pressures and temperatures.

It can also be observed that the highest value of separation factor, ~4600, has been obtained with a temperature of about 35° C. and permeate pressure of 40 Torr.

The asymmetric SBS membranes were successfully tested for TCA removal from water by pervaporation. The results obtained, in terms of flux and separation factor, are significantly superior to those reported in literature using composite commercial polymeric membranes fabricated from poly (dimethylsiloxane) (PDMS). In particular, the optimal performance of the SBS asymmetric flat membrane obtained in this study shows a separation factor of about 4600 and a TCA flux of about 19 g/m2 h at a temperature of 34° C. and 40 Torr with a feed containing a low concentration of TCA (in the range of 100 to 120 ppm). In comparing the performance of the asymmetric SBS membrane to those obtained with other membranes formed as composite membranes, we observe that the organic flux at a good separation factor (i.e., in excess of about 2000) obtained at low feed concentration, moderate temperature, and relatively high operating pressure is about 2 to 3 times better than that provided the PDMS composite membranes as typically used in this application.

EXAMPLE 8

Poly(ether block amide) (PEBA) membranes were prepared by dissolving the copolymer in dimethyl acetamide (20% PEBA). The 20 wt % solutions are cast on a heated glass plate. The solvent was evaporated. The membranes were then dried in an oven under vacuum at 80° C.

Other examples of elastomeric polymers that have use in the formation of the asymmetric, hydrophobic membranes of the invention include, but are not limited to, polybutadiene, styrene butadiene polymer, neoprene, polyisoprene, N-methyl pentene polymer, nitrile rubber. Most butadiene polymers are elastomeric and would be useful for purposes of forming membranes by the method disclosed herein. Other polymers could be used so long as the membranes are produced using elastomeric (rubbery) and hydrophobic polymers and so long as the Tg of the polymer is less than the temperature at which the target process is to be run.

Very dense membranes and membranes having very tight pores could be used mainly in pervaporation (PV) processes, but could also be used for reverse osmosis (RO) or nanofiltration (NF) processes.

As with all selective transfer processes utilizing membranes, the transfer of the target organic may be facilitated by physical, thermal or chemical forces. In example 7, physical and thermal forces create a chemical potential. These forces drive the process. In most processes, a combination of forces drive the transfer of the target organic across the membrane.

What we claim is:

1. A process of selectively separating a target organic component from a mixture containing the target organic component comprising:
   (a) passing said mixture containing the target organic component across an asymmetric hydrophobic membrane composed of a dense, thin discriminating layer on a thicker, porous layer, both said layers being composed of an elastomeric polymer, both said layers being of identical polymeric composition, wherein the mixture contacts and selectively crosses said discriminating layer,
   (b) collecting the target organic component emerging from said porous side of said asymmetric membrane.

2. The process of claim 1 wherein the process is facilitated by thermal pressure.

3. The process of claim 1 wherein the process is facilitated by physical pressure.

4. The process of claim 1 wherein the process is facilitated by chemically produced forces.

5. The process of claim 1 wherein the process is facilitated by one or more forces chosen from chemical forces, physical pressure and thermal pressure.

6. The process of claim 1 wherein the process is facilitated by reverse osmosis or by pervaporation.

7. The process of claim 1 wherein both said discriminating layer and said support layer are integrally formed.

8. The process of claim 7 wherein the process is facilitated by thermal pressure.

9. The process of claim 7 wherein the process is facilitated by physical pressure.

10. The process of claim 7 wherein the process is facilitated by chemically produced forces.

11. The process of claim 7 wherein the process is facilitated by one or more forces chosen from chemical forces, physical pressure and thermal pressure.

* * * * *